No. 641,828. Patented Jan. 23, 1900.
M. M. BROPHY.
APPARATUS FOR SUPPLYING HOT OR COLD WATER IN BATH ROOMS, LAVATORIES, &c.
(Application filed June 23, 1899.)
(No Model.) 4 Sheets—Sheet 1.
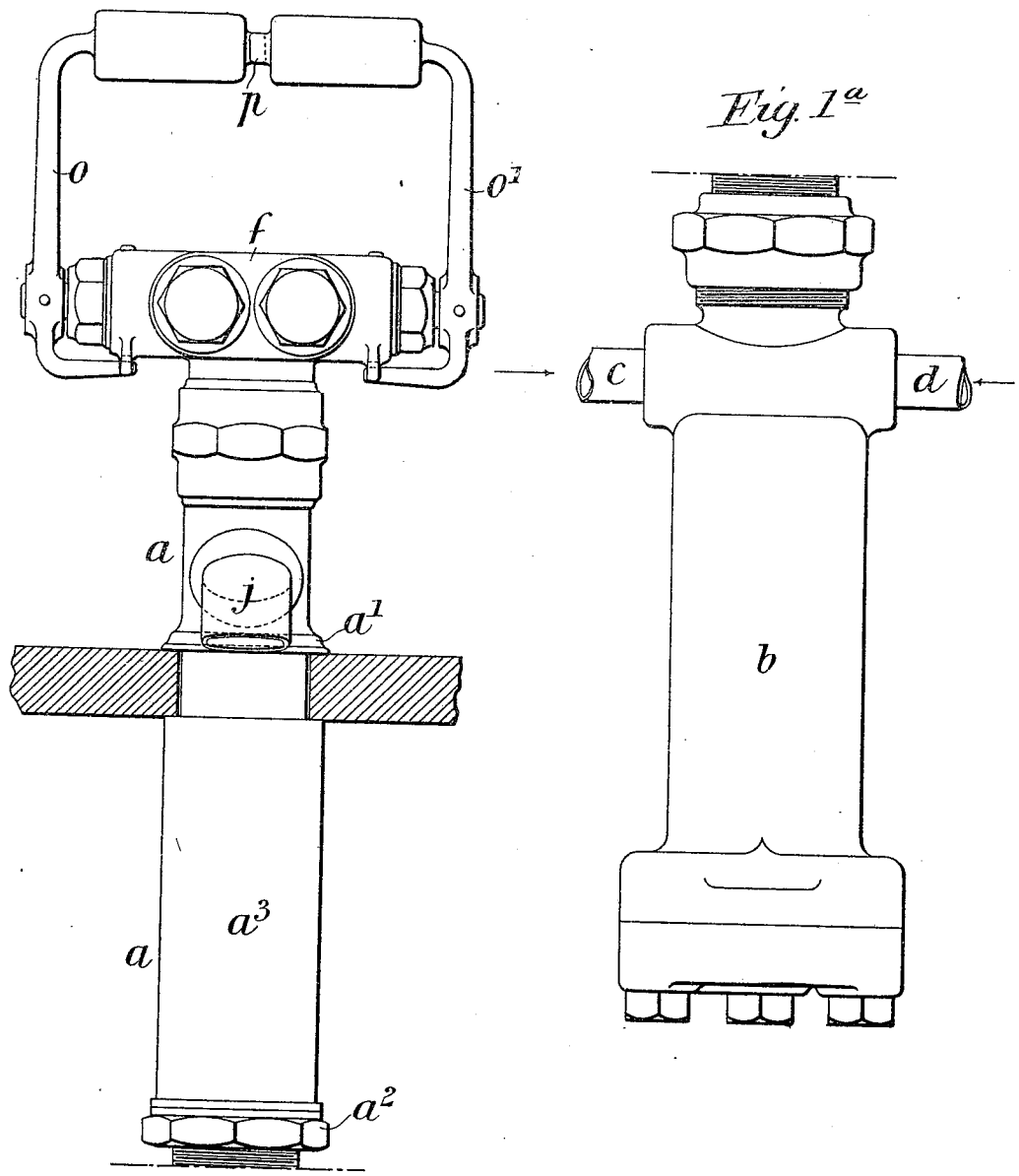
Witnesses
Inventor No. 641,828. Patented Jan. 23, 1900.
M. M. BROPHY.
APPARATUS FOR SUPPLYING HOT OR COLD WATER IN BATH ROOMS, LAVATORIES, &c.
(Application filed June 23, 1899.)
(No Model.) 4 Sheets—Sheet 2.
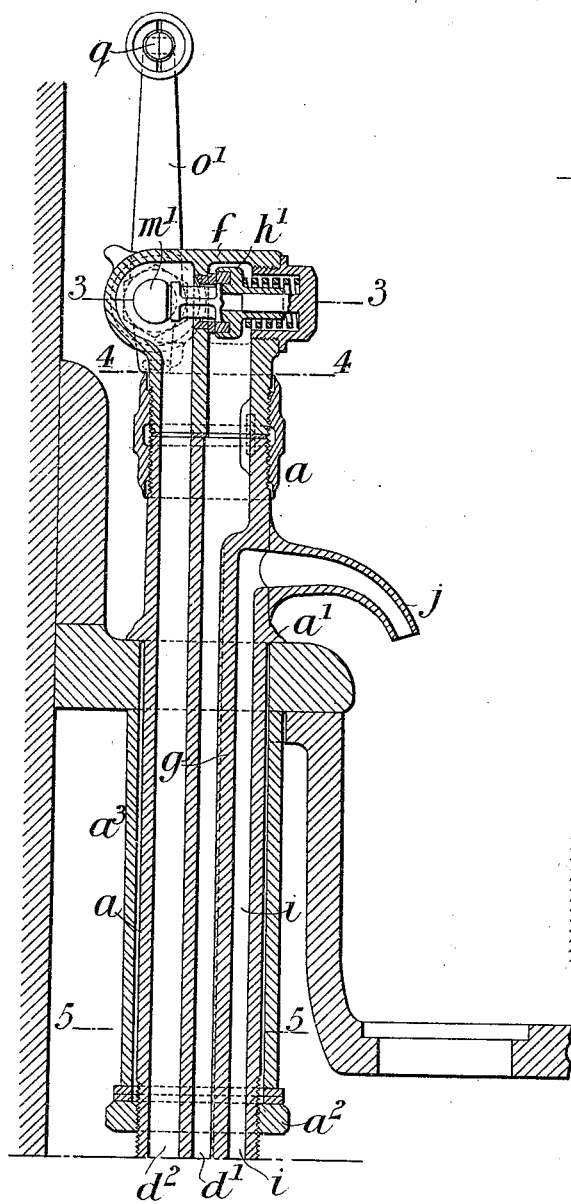
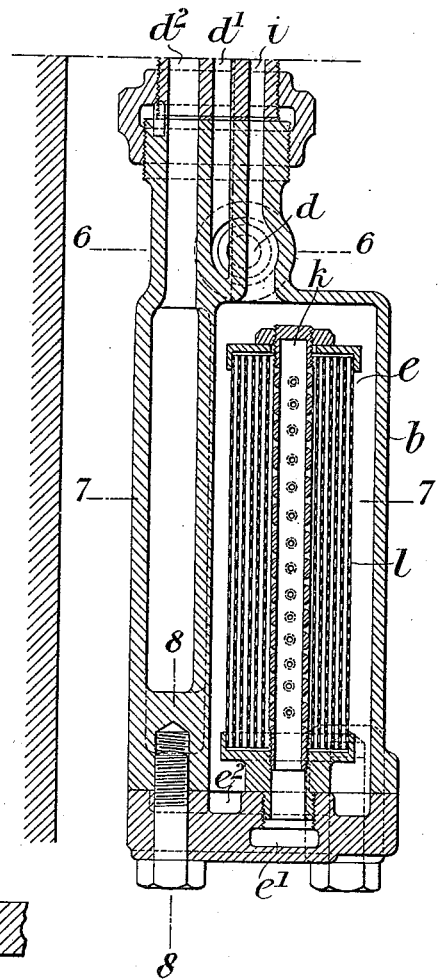
Witnesses
Inventor

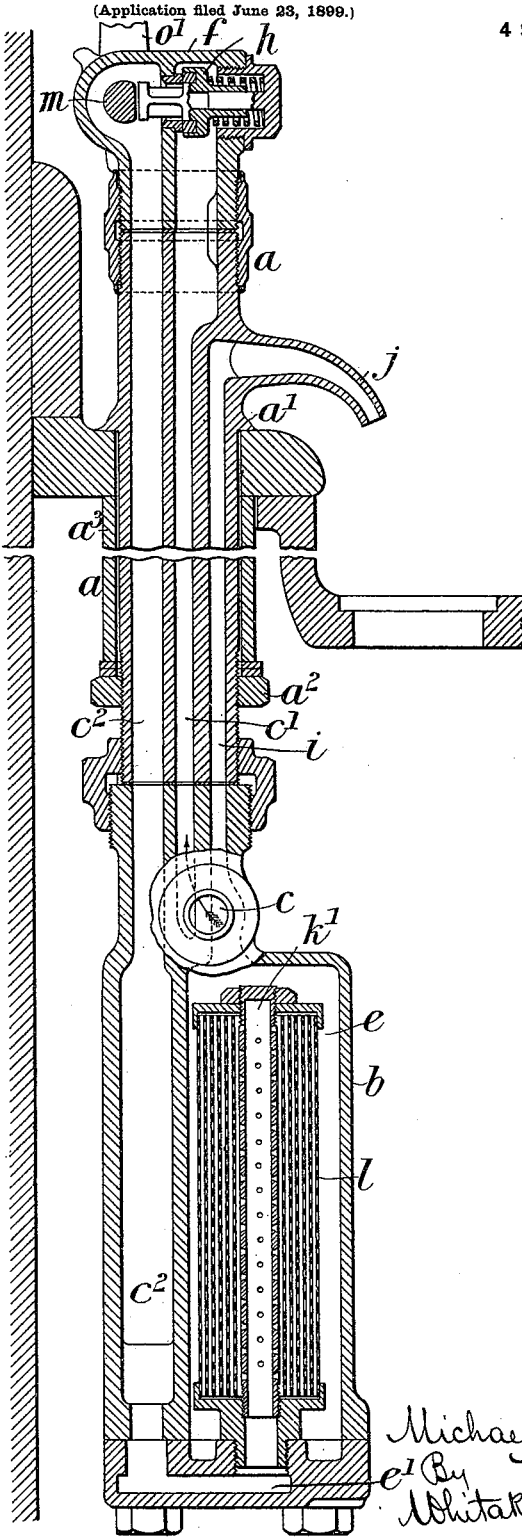

No. 641,828. Patented Jan. 23, 1900.
M. M. BROPHY.
APPARATUS FOR SUPPLYING HOT OR COLD WATER IN BATH ROOMS, LAVATORIES, &c.
(Application filed June 23, 1899.)
(No Model.) 4 Sheets—Sheet 4.

Witnesses.
G. J. Redfern
John E. Bousfield.

Inventor.
M. M. Brophy.

THE NORRIS PETERS CO., PHOTO-LITHO., WASHINGTON, D. C.

UNITED STATES PATENT OFFICE.

MICHAEL MARY BROPHY, OF LONDON, ENGLAND.

APPARATUS FOR SUPPLYING HOT OR COLD WATER IN BATH-ROOMS, LAVATORIES, &c.

SPECIFICATION forming part of Letters Patent No. 641,828, dated January 23, 1900.

Application filed June 23, 1899. Serial No. 721,593. (No model.)

*To all whom it may concern:*

Be it known that I, MICHAEL MARY BROPHY, a subject of the Queen of Great Britain, residing at London, England, have invented new and useful Improvements in Apparatus for Supplying Hot or Cold Water in Bath-Rooms, Lavatories, Pantries, and other Places, (for which I have applied for a patent in Great Britain, No. 12,163, dated June 10, 1899,) of which the following is a specification.

My invention relates to apparatus for supplying hot or cold water for bath-room, lavatory, domestic, and other purposes and to that class of apparatus wherein both the hot and cold water are delivered through a single nozzle or spout and wherein the hot water is obtained by introducing more or less steam into the cold water as the latter is being delivered, the object of my invention being to improve the construction of this class of apparatus and to provide means whereby it will be impossible for the steam to be delivered without water.

Figure 3:
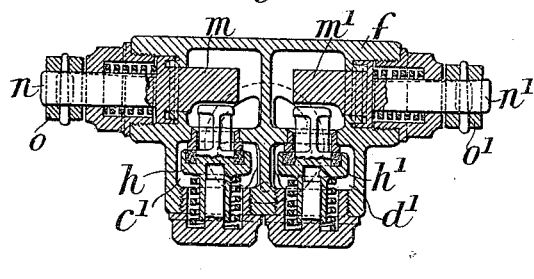
Figure 4:
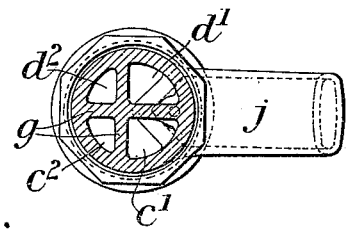
Figure 5:
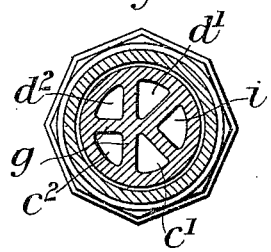
Figure 6:
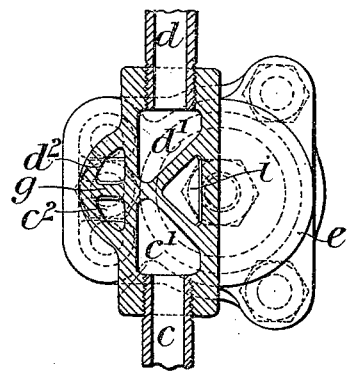
Figure 7:
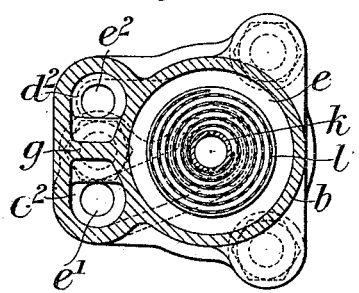
Figure 8:
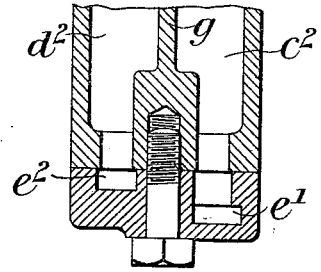

In the accompanying drawings, Figure 1 is an elevation of the upper part of my improved apparatus. Fig. 1$^a$ is a similar view of the lower part of the same. Fig. 2 is a vertical sectional view of the upper part of the apparatus. Fig. 2$^a$ is a similar view of the bottom portion of the apparatus, the section being taken through the water-passages. Fig. 2$^b$ represents a vertical sectional view of the two parts in proper relative positions, a portion of the upper part being broken away to enable the figure to be brought within the limits of the sheet, the section being taken through the steam-passages. Fig. 3 is a horizontal section on line 3 3 of Fig. 2. Fig. 4 is a horizontal section on line 4 4 of Fig. 2. Fig. 5 is a similar section on line 5 5 of Fig. 2. Fig. 6 is a similar section on line 6 6 of Fig. 2$^a$. Fig. 7 is a similar section on line 7 7 of Fig. 2$^a$. Fig. 8 is a vertical section on line 8 8 of Fig. 2$^a$.

$a$ is the stem or standard of the apparatus, which is adapted to be held in any suitable manner—for instance, as shown in Fig. 2, which represents my apparatus as applied to a lavatory-basin—by providing it with a flange $a'$, which rests upon the lavatory-top, and a collar $a^2$, which is tightened against the under side of the said top through the medium of a sleeve $a^3$, as shown in Figs. 1 and 2, the sleeve being provided and the stem being made of extra length to avoid the inconvenience of having to tighten up the collar $a^2$ in a confined space.

$b$ is a heater which is attached to the lower end of the said stem and has connected to it steam and water inlet pipes $c$ $d$, respectively, and formed in it a chamber $e$, into which the water and steam which flow through the pipes $c$ $d$ mix and which I will hereinafter refer to as the "mixing-chamber." $f$ is a twin cock, which is mounted upon the upper end of the stem and which serves to control the admission of steam and water through the pipes $c$ $d$. The said stem, heater, and cock have formed in them by partitions $g$ passages, as follows—namely, a passage $c'$, which extends from the steam-pipe $c$ up to the valve $h$ of the cock $f$, and a passage $c^2$, which extends down from the valve $h$ to the chamber $e$, into which it opens through the port $e'$, a passage $d'$, which extends from the pipe $d$ up to the valve $h'$ in the cock $f$, and the passage $d^2$, which extends down from the valve $h'$ to the chamber $e$, into which it opens through the port $e^2$, and the passage $i$, which extends from the top of the chamber $e$ to the spout $j$. The port $e'$ has connected to it a perforated pipe $k$, Figs. 2 and 7, around which wire-gauze $l$ or other suitably-perforated material is wound or placed, this gauze being provided for the purpose of breaking up the steam which enters the chamber through the perforated pipe $k$ and causing it to intermingle with the water which enters the chamber through the port $e^2$ without noise.

With the arrangement hereinbefore described it will be understood that when the valve $h$ is opened steam will flow through the steam-pipe $c$, the passages $c'$ $c^2$, the port $e'$, the perforated pipe $k$, and the wire-gauze $l$ into the chamber $e$ and thence, assuming there is no water in the chamber, through the passage $i$ to the spout $j$. If, on the other hand, the cock $h'$ is opened, water will flow from the pipe $d$ through the passages $d'$ $d^2$ and the port $e^2$ into the chamber $e$ and thence through the passage $i$ to the spout $j$.

The cock $f$ which is used may be of any desirable construction. In practice, however, I find it advantageous to make use of cocks of the kind described in the specification filed with my application of even date with this application, Serial No. 721,592, wherein the valves $h\ h'$ are operated by cams $m\ m'$, respectively, as shown in Figs. 2 and 3, the said cams being upon spindles $n\ n'$, which are respectively provided with the operating-levers $o\ o'$.

In order to prevent steam from flowing through the apparatus without water, I cause the adjacent ends of the levers $o\ o'$ to overlap, as indicated at $p$ in Fig. 1, the said ends being halved, as shown at $q$ in Fig. 2, so that the handles when in their normal position will be in the same axial line. With this arrangement it will be obvious that the lever $o$ for admitting steam cannot be moved without moving the lever $o'$ for admitting water, while the lever $o'$ of the water-valve can be moved independently of the lever $o$ of the steam-valve in order to obtain cold water when desired.

In practice the supply of steam and water to the apparatus should be so proportioned that when, say, both valves are fully open hot water will flow through the spout $j$, cooler water being obtainable by more or less shutting-off the supply of steam.

A great feature of my apparatus is that it is extremely compact and that the steam and water supply connections and the heater can be absolutely concealed, while at the same time the cocks for controlling the supply of steam and water can be directly operated.

Having now particularly described and ascertained the nature of my said invention and in what manner the same is to be performed, I declare that what I claim is—

1. The combination with the mixing-chamber provided with a discharge-passage, of a steam-inlet pipe connected with said mixing-chamber, a separate water-inlet pipe connected with said chamber, a valve controlling the admission of steam to said mixing-chamber, a separate valve controlling the admission of water to said mixing-chamber, and devices connected with the steam-controlling valve for simultaneously operating the water-controlling valve, whereby the water-controlling valve may be opened without affecting the steam-controlling valve, but the opening of the steam-controlling valve will simultaneously open the water-controlling valve, substantially as described.

2. The combination with the mixing-chamber provided with a discharge-passage, of a steam-inlet pipe connected with said mixing-chamber, a separate water-inlet pipe connected with said chamber, a valve controlling the admission of steam to said mixing-chamber, a separate valve controlling the admission of water to said mixing-chamber, an operating-lever for the steam-valve, and an operating-lever for the water-valve having a part in the path of the operating-lever for the steam-valve, whereby the water-valve can be operated alone but the operation of the steam-valve will cause the simultaneous operation of the water-valve, substantially as described.

3. The combination with a standard provided with a mixing-chamber, a delivery-passage communicating therewith, a water-inlet, a steam-inlet, and passages from said water and steam inlets to the said mixing-chamber, of independent water and steam controlling valves in said passages, an operating device for the steam-valve, and an operating device for the water-valve, having a part in the path of the operating device for the steam-valve, substantially as described.

4. The combination with the vertically-disposed standard provided with a delivery-passage and spout, and a series of independent vertical passages, a water-inlet connected with one of said passages, and a steam-inlet connected with another of said passages, and means for attaching said standard to a suitable support, of a heater below said standard provided with a mixing-chamber, communicating with said delivery-passage, and spout, and a series of independent vertical passages communicating with the vertical passages in said standard and adapted to conduct steam and water to said mixing-chamber, a perforated steam-pipe in said mixing-chamber communicating with one of said vertical passages, a series of layers of wire-gauze surrounding said perforated pipe a valve located in the upper part of said standard for controlling the passage of water to the mixing-chamber, and an independent valve in the upper part of said standard for controlling the admission of steam to the mixing-chamber, substantially as described.

MICHAEL MARY BROPHY.

Witnesses:
G. T. REDFERN,
JOHN E. BOUSFIELD.